May 6, 1958  K. F. SCHLICHTING  2,832,988
METHOD OF CONVEYING FISH THROUGH FISH DRESSING MACHINES
Filed Dec. 16, 1954
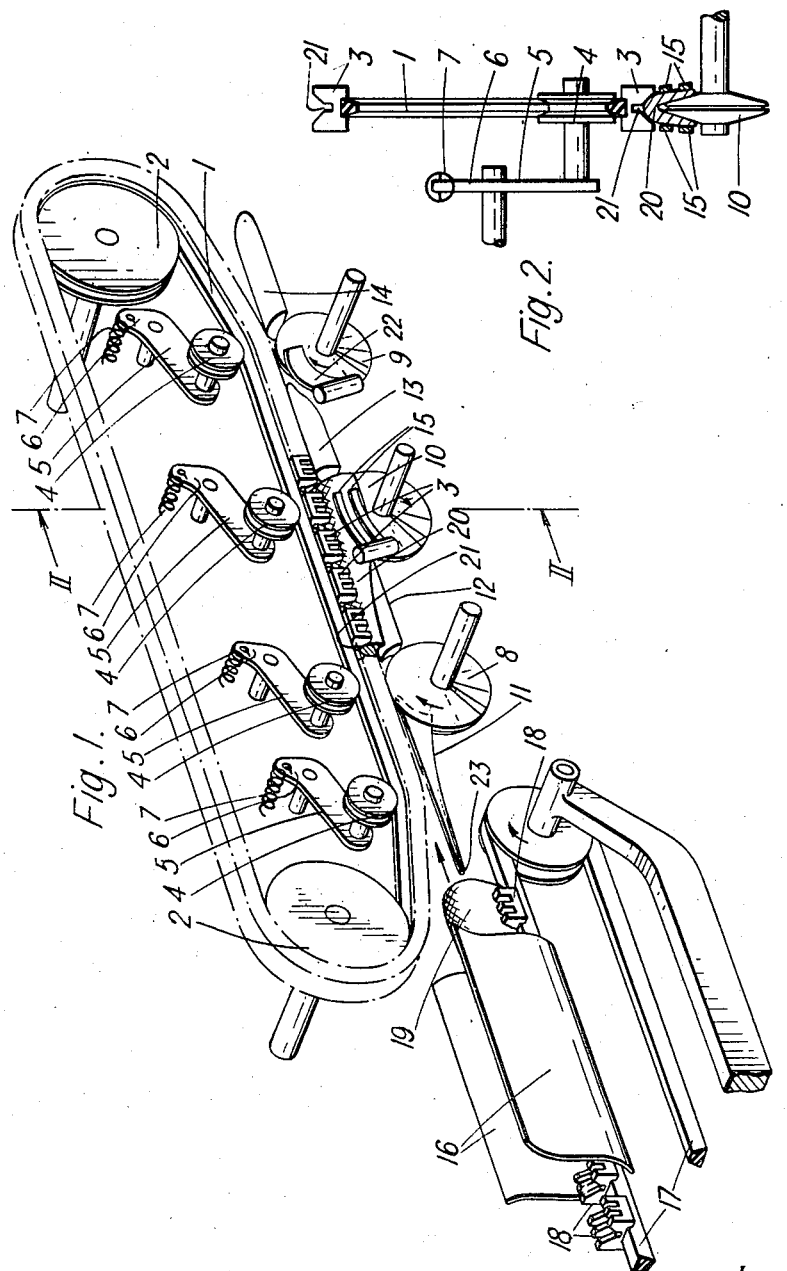
Inventor
K. F. Schlichting
By Richard J. Geier
Attorneys

United States Patent Office 2,832,988
Patented May 6, 1958

2,832,988

METHOD OF CONVEYING FISH THROUGH FISH DRESSING MACHINES

Karl Friedrich Schlichting, Lubeck, Germany, assignor to Nordischer Maschinenbau Rud. Baader, Lubeck, Holstein, Germany, a company of Germany Application December 16, 1954, Serial No. 475,642

Claims priority, application Germany November 5, 1954

1 Claim. (Cl. 17—45)

The invention relates to a method of conveying fish through a fish dressing machine and consists in that the fish are carried by the dressing tools by a conveying device which grips the backs of the fish.

The condition of the dressed fish and the number of fish which can be dressed in a specified unit of time is dependent to a great extent upon the fish being conveyed in a perfect manner through the different dressing operations. The fish must not only be fed into the machine in a perfect manner but must be accurately introduced into the different operations and the manner in which the fish are guided while being dressed has an important influence on the clean and rapid carrying out of the entire dressing operation. Many methods have been introduced to attain this object without, however, a satisfactory solution to the problem having been found. The method of conveying most generally used is that wherein the fish are pulled through the machine gripped by the tail; this method has many disadvantages because it is frequently not possible to adapt the pull to the resistance to forward motion, caused by the work being carried out by the tools, without damaging the flesh of the fish. Conveying the fish from the sides is objectionable because this method interferes with the arrangement of the tools if only lateral transport is used. Furthermore conveying means which penetrate certain portions of the fish are disadvantageous because they damage the flesh of the fish.

It has now been found that all these objections can be avoided if, according to the invention, the fish are pushed or carried past the tools by a conveying device which grips the backs of the fish. In this method of conveyance very firm fish backs are available in most cases as gripping surface for the conveying device, the thrust effect in the opposite direction to the growth of the scales being particularly reliable and avoids any detrimental tensional stressing of the flesh of the fish, because the thrust could only result in a compression of the fish flesh which, however, cannot take place owing to the possibility of gripping the fish along almost its entire length and guiding it also from the sides and the belly. On the other hand, it is not possible to eliminate stresses produced in the fish by the pull exerted by any other conveying means.

The process according to the invention is preferably carried out in such a manner that the conveying device holding the fish head foremost with the belly riding on a saddle guide, pushes the fish past the tools which act from the belly side. As the head end is the thickest part of the fish, an intensive thrust effect is attainable without the fish slipping under the conveying device or becoming distorted on encountering resistances. The favorable effect of the thrust can be still further improved by exerting pressure on the sides of the fish without this pressure also necessitating any movement being exerted on the fish. The fish is preferably fed to the conveying device which grips its back, accurately centered in the necessary lateral and vertical position, so as to render unnecessary from the outset any subsequent action on the fish in this respect and ensure the smooth passage of the fish through the different working stages.

The construction of the device for carrying out the invention is extremely simple because it can consist chiefly of an endless conveyor belt which is driven in known manner by pulleys. The conveyor belt preferably carries roof-shaped grippers the section of which is adapted to the shape of the parts of the fish to be engaged. To ensure that the fish is reliably gripped and pushed past the tools, the operating strand of the endless belt is pressed with the aid of resiliently mounted pressure rollers, which rollers are preferably located within the operating range of the tools.

The accurate centering in lateral and vertical position is preferably effected by a feeding device cooperating with a saddle guide. The necessary lateral pressure can be produced by lateral endless belts or separate pressure elements on the individual tools.

One form of construction of apparatus for carrying out the method according to the invention is illustrated diagrammatically in the accompanying drawing, in which:

Fig. 1 is a perspective view of the conveying device, and

Fig. 2 is a section taken on line II—II of Fig. 1, viewed in the direction of the arrows.

In the drawing all those parts are omitted which are not necessary for understanding the invention, so as to enable the conveying device to be seen more clearly. The conveying device consists of an endless conveyor belt 1 which is driven in known manner by pulleys. The belt 1 is fitted with grippers 3, only some of which are shown in the drawing. It is apparent that the grippers 3 engage the entire back of the fish body 19 by frictionally engaging portions of the back extending along the entire length thereof, so that this frictional engagement is adapted to follow the outline of the back of the fish body. The lower strand of the belt is kept taut by pressure rollers 4 which are mounted on one arm 5 of two-armed levers, the other arm 6 of these levers being each acted upon by a tension spring 7. The tools are arranged below the belt 1 and, in the example illustrated, comprise two circular knife aggregates 8 and 9 and a cleaning disk 10. Stationary saddle guides 11, 12, 13 and 14 are provided in front of the first tool, between the tools and behind the last tool respectively. On both sides of the cleaning disk 10 pressure fingers 15 are arranged in known manner.

To introduce the fish into the dressing process a catching device is provided into which the fish drop from a feeding device. This catching device consists of two rigid lateral walls 16 inclined towards each other and between the lower ends of these walls and endless conveyor belt 17 is arranged which is fitted with grippers 18 similar to those on the conveyor belt 1. Each fish 19 drawn out of the catching device by the belt 17 passes between the grippers 3 on the conveyor belt 1 running off the front pulley 2 and the front saddle guide 11 so that the fish, accurately centered in lateral and vertical direction, is fed to the first tool aggregate 8. A fish riding on the saddle guide 12 is shown within the range of the cleaning disk aggregate 10.

Thus the present invention is concerned with the guiding of fish through fish dressing machines and the novelty of the invention consists in that the fish is held at its back and is pushed to and past various cutters and other tools.

The advantage of this method of conveying fish as distinguished from the prior art methods of pulling the fish by the tail is that through the pulling of the fish tensions are caused in the meat which result in the damage of the meat when the meat is cut by the tools. This is eliminated if the fish is pushed forward, particularly when it is pushed in the direction opposite to that of the scales, namely when the head or the front end of the fish body is located in front.

The fish is shifted by hand or by a mechanical guide to a holder 16, and is moved by the endless band 17 provided with gripping elements 18. The fish is so located that it leaves holder 16 with the head end forward and with the belly directed downwardly as shown at 19. In the course of the further movement the fish strikes the projecting point 23 of the guide 11 and the projection 23 penetrates into the body of the fish and into the belly cavity below the backbone. Then the fish is mounted upon the guide 23 with the lower side of the backbone firmly upon the guide and is then grasped at its back by the holders 3 of the band 1 and is pushed forward. The fish then reaches the pair of knives 8 while the guide 11, 23 leaves the body of the fish at its rear end. The fish leaving the pair of circular knives 8 is pushed by the holders 3 of the band 1 and riding with the lower side of the backbone upon the guide 12, reaches the next tool which, in the example illustrated, is a cleaning disc which cleans the belly cavity. Thence the fish rides over the guide 13 to a second pair of circular knives 9 and thence over the guide 14 to the next tool or to a container.

I claim:

A method of conveying fish during a dressing operation, said method comprising the steps of engaging the entire back of a fish body by frictionally engaging portions of said back extending along the entire length thereof, whereby said frictional engagement is adapted to follow the outline of said back, pushing said fish body with its head portion forward while maintaining said frictional engagement, and simultaneously dressing said fish body.

References Cited in the file of this patent

UNITED STATES PATENTS

| | | |
|---|---|---|
| 768,166 | Barnard | Aug. 23, 1904 |
| 2,245,329 | Danielsson | June 10, 1941 |
| 2,353,654 | Danielsson | July 18, 1944 |
| 2,507,810 | Oates | May 16, 1950 |
| 2,518,772 | Grausgruber | Aug. 15, 1950 |
| 2,625,708 | Oates | Jan. 20, 1953 |
| 2,637,064 | Miller | May 5, 1953 |
| 2,680,876 | Oates | June 15, 1954 |